United States Patent [19]

Ananias

[11] Patent Number: 4,547,211

[45] Date of Patent: Oct. 15, 1985

[54] CONTROL OF A GLASSWARE FORMING MACHINE

[75] Inventor: James W. Ananias, Muncie, Ind.

[73] Assignee: Ball Corporation, Muncie, Ill.

[21] Appl. No.: 652,144

[22] Filed: Sep. 17, 1984

Related U.S. Application Data

[63] Continuation of Ser. No. 453,122, Dec. 27, 1982, abandoned, which is a continuation of Ser. No. 283,003, Jul. 13, 1981, abandoned, which is a continuation of Ser. No. 66,297, Aug. 13, 1979, abandoned, which is a continuation of Ser. No. 898,188, Apr. 20, 1978, abandoned.

[51] Int. Cl.⁴ .............................................. C03B 9/40
[52] U.S. Cl. .......................................... 65/29; 65/159; 65/163; 65/164; 65/DIG. 13; 364/473; 364/476
[58] Field of Search ................ 65/29, 158, 159, 161, 65/162, 163, 164, DIG. 13; 364/473, 476

[56] References Cited

U.S. PATENT DOCUMENTS

| Re. 29,188 | 4/1977 | Croughwell | 65/161 X |
|---|---|---|---|
| 3,762,907 | 10/1973 | Quinn et al. | 65/DIG. 13 |
| 4,007,028 | 2/1977 | Bublitz | 65/DIG. 13 |
| 4,108,623 | 8/1978 | Cárdenas-Franco | 65/29 X |
| 4,152,134 | 5/1979 | Dowling et al. | 65/29 X |
| 4,247,317 | 1/1981 | Wood et al. | 65/163 X |
| 4,402,721 | 9/1983 | Ericson et al. | 65/29 |
| 4,457,772 | 7/1984 | Haynes et al. | 65/29 X |

*Primary Examiner*—Arthur Kellogg
*Attorney, Agent, or Firm*—Gilbert E. Alberding

[57] ABSTRACT

A glass forming system having a plurality of machines, each of which includes a plurality of individual sections having movable components which operate in timed relationship with respect to one another. An electronic control system effects the automatic synchronous operation of the various individual sections of each machine to thereby automatically and continuously form hollow glass articles. The electronic control system includes a mini computer with associated storage units for storing data for controlling the operation of the glass forming machinery. Information is written into and read out of the mini computer by means of a printer and cathode ray tube console. An electronic interface unit connects commands from the mini computer to the control circuits for each of the sections of the glass forming machines and a group function machine component time varying circuit is connected to the mini computer via the electronic interface unit for changing the timing of selected groups of components in each of the individual sections of the glass forming machinery.

8 Claims, 9 Drawing Figures

CONTROL OF A GLASSWARE FORMING MACHINE

This application is a continuation of application Ser. No. 453,122, filed Dec. 27, 1982, which is a continuation of application Ser. No. 283,003, filed July 13, 1981, which is a continuation of application Ser. No. 066,297, filed Aug. 13, 1979, which is a continuation of application Ser. No. 898,188, filed Apr. 20, 1978, all now abandoned.

BACKGROUND OF THE INVENTION

This invention relates to a system for controlling the timing of the operation of the various components of a plurality of individual sections of glass forming machinery.

Glass forming machines are typically made up of a plurality of individual sections each capable of manufacturing by itself glassware. The sections are operated in synchronism in such relative phase relationship as to permit the several sections to acquire gobs of molten glass for a single source in ordered sequence. Thus, as one of the sections is taking a gob from the gob feeder another section is delivering a finished article to an output conveyor and other sections are engaged in various forming steps intermediate the taking of a gob and the production of the finished ware.

In order to control the operation of the various functional components of each individual section of the glass forming machine, a means must be provided for actuating each of the elements in a pre-selected cyclic time format so that the operation of one element or component does not interfere with, but rather complements, the operation of the other components.

The several functional elements or components of the glass forming machine are typically driven by pneumatic pressure which is controlled by an electronic timing circuit. An example of prior art controllers utilizing electronic timing means may be found in Quinn et al, U.S. Pat. No. 3,762,907 and Kwiatkowski et al, U.S. Pat. No. 3,969,703, both of which are assigned to the common assignee herewith. Other examples of prior art electronic controllers may be found in Croughwell, U.S. Pat. No. Re. 29,188, and Mylchreest et al, U.S. Pat. No. 3,877,915. Each of these controllers typically includes a timing means for generating a machine cycle clock pulse train in synchronism with the operation of the machine being controlled wherein the cycle clock pulses provide an instantaneous indication of the time elapsed in each cycle of operation of the machine. In each individual section a storage unit such as a random access memory or a recirculating shift register stores the relative times in the machine cycles when each of the plurality of components of the machine are to be actuated. A comparator arrangement then compares the output of the pulse generator which indicates the time elapsed in each cycle with the stored values in the storage unit. When a comparison is made, an actuating signal is generated for indicating that the functioning of the machine component is to be either started, stoped or modified. To determine which machine component is to be actuated, an addressing means is provided which when enabled by the output of the comparator selects the particular component which is to be actuated at that time in the machine cycle. A component operating command is then provided to the appropriate component to thereby control the operation thereof. These electronic controlling systems include an arrangement for varying the time at which a particular machine component is to be actuated while the machine is operating. Further, as disclosed in the Mylchreest et al and Croughwell patents, the timing of certain machine components can be varied as a group. Thus, certain boundaries which define a group of machine components are established which relate to the thermodynamics of the glassware forming process. These boundaries permit the use of a computer or controller, appropriately programmed, to alter the boundaries by predetermined increments to vary machine operation and to improve the machine's efficiency. Further, these machines include systems for initiating a starting or stopping sequence at any time during the machine cycle, so that once a starting or stopping sequence is initiated, the machine is controlled according to a pre-selected starting or stopping cycle so that the machine can be safely and efficiently turned on or shut down.

Each of the aforementioned individual sections of the glass forming machine must be controlled in an interdependent cyclic phase relationship with respect to one another and, as is often the case, the modification of the timing of one unit may necessitate a change in the timing of another unit and, in addition, the relative timing sequence of all the units taken together may be modified dependent upon the type of glassware being formed, ambient conditions, etc. Accordingly, there is a need in the art for a simplified, operator control system for controlling the timing of the various IS machines. In order to do this, there must be a means for obtaining immediate access to all of the glass forming machine function timing information and in response thereto to permit automatic loading, storing, displaying and printing of glass machine function timing information.

It is therefore an object of this invention to provide a simplified arrangement for permitting an operator to control and modify the timing of the respective components of each of a plurality of individual section glass forming machines.

SHORT STATEMENT OF THE INVENTION

Accordingly, this invention relates to a glassware forming system including a plurality of glassware forming machines each having a plurality of individual sections which include a plurality of movable components which operate in timed relationship with respect to one another. A molten glass feeder feeds gobs of molten glass at a uniform rate from a predetermined location to each of the sections of each glass forming machine, with each of the sections forming rigid glassware articles from the gobs. Each machine includes a timer for indicating the instantaneous time elapsed in each cycle of operation of the machine, and each individual section includes a storage unit for storing the sequential relative times during each cycle when each of the plurality of components are to be actuated. A comparator compares the instantaneous time elapsed in each cycle with the stored relative component actuating times to provide a signal for controlling the machine component whose component actuating time compared with the cycle time elapsed. An operator control unit includes a printer for providing a recorded output of a mini computer and a cathode ray tube console for displaying information keyed into the mini computer as well as the output of the computer. The computer includes a storage unit for storing timing information with respect to the components of each of the individual sections of each glass forming machine, and also includes an electronic interface for controlling and flow of information from the mini computer to the cathode ray tube, the electronic controls for each of the individual sections and to a group function control system for controlling the variance of machine component operating times in groups. The electronic interface system also controls the flow of information from the group function control system, the key board of the cathode ray tube console and the individual section electronic control units to the mini computer. The purpose of the mini computer is to control the phase relationship of each of the individual sections of the glass forming machine, to modify the timing of each of the components in the individual sections, as well as to control the relative timing of each of the individual sections with respect to one another, and to provide a visible indication to an operator of the current status of operation of the glass forming machine.

BRIEF DESCRIPTION OF THE DRAWINGS

Other objects, features and advantages of the present invention will become more fully apparent from the following detailed description of the preferred embodiment, the appended claims and the accompanying drawings, in which:

DETAILED DESCRIPTION OF THE PREFERRED EMBODIMENT

Figure 1:
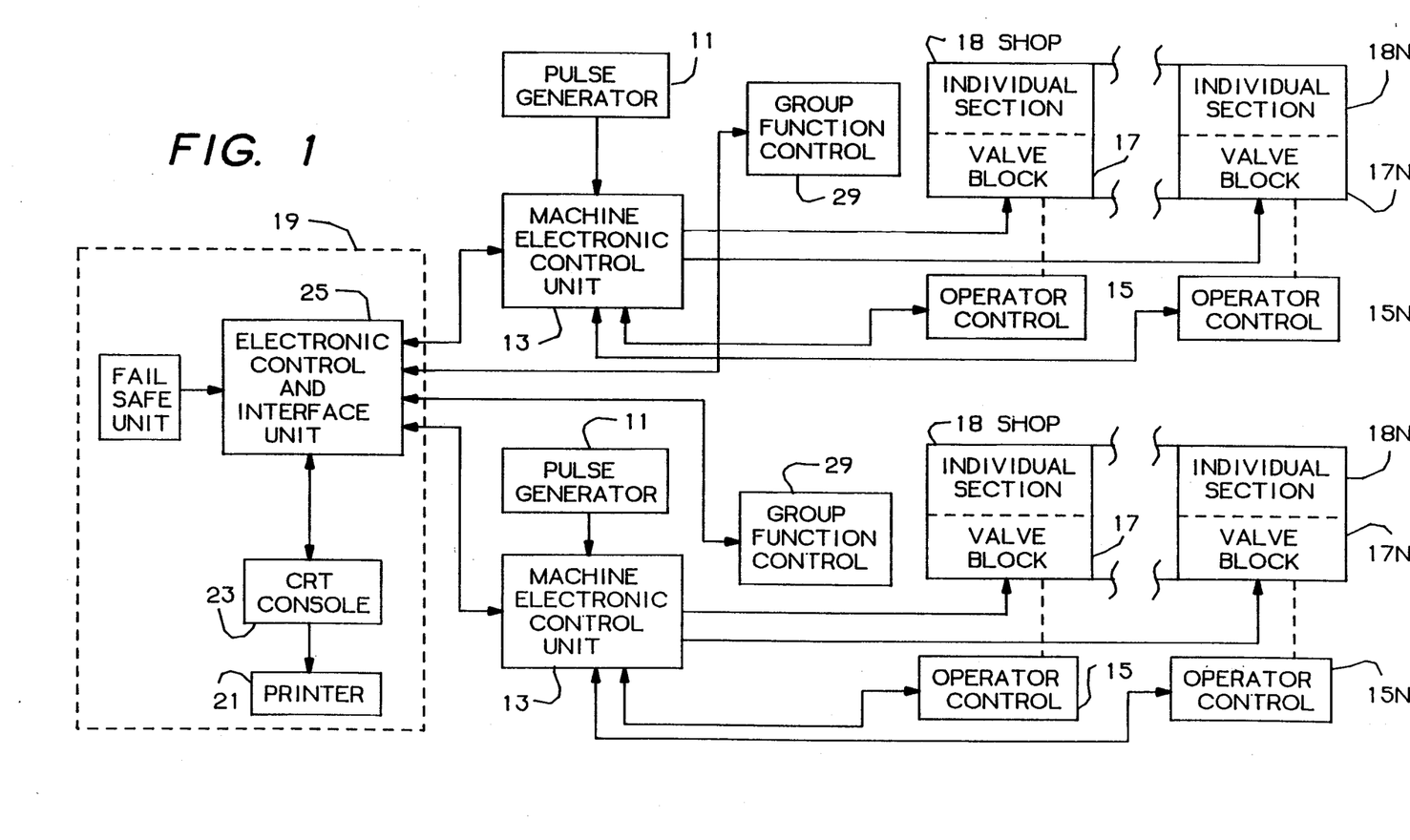
FIG. 1 is a simplified block diagram of the programmable control system for a glass forming machine of the present invention.

Refer now to FIG. 1 which is a schematic block diagram of the control system for the glass forming system of the present invention. Illustrated in block diagram form are two glass forming machines each having a plurality of individual sections. It should be understood that while only two glass forming machines are illustrated, there may be any suitable number depending on the size of the plant facilities and the volume of glassware produced. Further, since each glassware machine and the individual sections therein are of the same general construction, like numerals will identify like components of the system. Each glass forming machine includes a pulse generator 11 which provides a train of cycle clock pulses having a frequency which is dependent upon the cycle time of the glassware forming machinery. The generator also provides a reset pulse at the completion of each machine cycle. The pulse generator may operate on a time base, in which case the machine cycle is divided into a convenient number of clock pulse intervals or, in the alternative, the generator may operate on a machine cycle base in which case 360 clock pulse intervals or a convenient multiple thereof are generated each machine cycle. As an example, the pulse generator may include a conventional pulse generating means mounted on the drive shaft of the glass forming machine for generating two pulse trains. The first pulse train provides a cycle clock pulse for every degree of machine rotation, and the second pulse train provides one pulse per machine revolution.

The output of the pulse generator 11 is coupled to a machine control unit 13. Each control unit includes a plurality of individual section control units illustrated in FIG. 2 and described in detail in Kwaitkowski et al, U.S. Pat. No. 3,969,703 and assigned to the common assignee herewith. Each section control unit controls the timing of the movable components of an individual section of the glass forming machine. In addition, each control unit 13 includes a counter for changing the relative time in the machine cycle when selected machine components are to be operated.

The operator controls 15 include "start" and "stop" pushbuttons for initiating a sequence of machine control commands for starting up or shutting down the individual section being controlled. In addition, the operator controls 15 include a degree display for the particular individual section with which it is associated. Finally, the operator controls 15 include "sooner" and "later" pushbuttons for controlling the counter in the control unit 13 and a function select control for designating which operational element in the individual section is having its timing changed by the counter. The operator controls 15 are preferably positioned near the machine 18 being controlled, so that the operation of the individual section can be manually monitored, if desired, while the various control functions of the operator controls are being changed.

The output of each of the control units 13 is coupled to an associated valve block machine interface 17 which provides the mechanical drive means for the machine 18 which is being controlled. If, for example, the machine being controlled is operated on a pneumatic basis, the valve block interface would include a number of valves which are controlled by solenoid actuators, the solenoid actuators being in turn controlled by the output of the memory unit 13. A detailed description of the valve block machine interface is not presented herein because actuators and valves for operating machine elements are known in the art. In the alternative, if electric motors were utilized, for example, to drive various movable components, a series of SCR's or other such current control devices could be used in lieu of the valve block assembly. Each of the SCR's would be controlled by the output of the control units 13.

A central control 19 is provided for controlling each of the control units 13. The central control unit 19 includes a printer 21 of conventional design known in the art and a cathode ray tube console 23 which is also of conventional design. The cathode ray tube console includes a display and a keyboard wherein the information for controlling the timing of the various section control units 13 is displayed on the monitor or displayed as the information is keyed into the electronic control and interface unit 25. The printer prints out the information keyed into the electronic control interface unit 25 as well as other information such as relative timing information for each of the components of the individual sections 18–18n of each machine.

The electronic control interface unit 25 includes a mini computer and a storge unit, wherein the mini computer is appropriately programmed to control the operation of the respective section control units 13. The mini computer program listing attached hereto as the Appendix is written such that the operator simply responds to a sequence of computer generated interrogatives in order to perform an operation. This substantially simplifies operator control procedures and eliminates the requirement of substantial knowledge of computers and programming in order to operate the system. A "fail safe" unit 27 serves as a safety override in case the operator should commit error in operating the console 23. The "fail safe" unit includes a switch which must be set in a specific position in order for communication to occur between the mini computer, the electronic control interface unit 25 and the respective section control units 13.

A group function control 29 is positioned at each glass forming machine and is for the purpose of making several time of operation changes simultaneously in each individual section of the glass forming machine. This operation can be important when the change in time of operation of one component necessitates a corresponding change in timing of other components. As will be explained more fully hereinbelow, the operation, called group function control, is controlled by the mini computer in central control 19.

Figure 2:
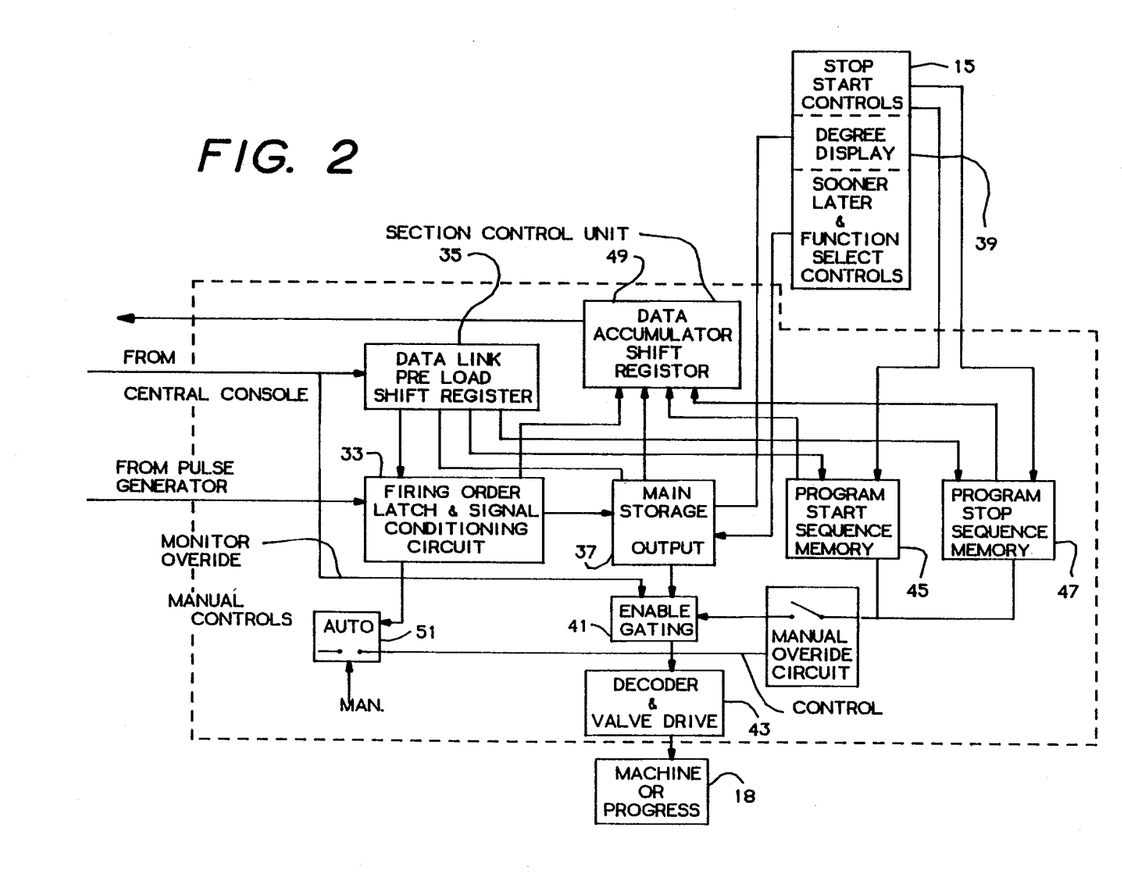
FIG. 2 is a more detailed functional block diagram of the control system for each individual section of the glass forming machine of the present invention.

Refer now to FIG. 2 with respect to which a more detailed description will be given of an individual section control unit and an operator controls 15 for one of the individual sections 18. It should be understood that each electronic control unit 13 includes a plurality of individual section control units, one for each individual section 18 of a glass forming machine. The individual section control unit illustrated in FIG. 2 is disclosed in detail in Kwiatkowski et al, U.S. Pat. No. 3,969,703, the subject matter of which is incorporated herein by reference thereto. However, a brief description of the control unit will be provided herein in order to provide a better understanding of the invention. The output of the pulse generator 11 is coupled to the firing order latch and signal conditioning circuit 33. The firing order latch circuit and signal conditioning unit 33 is controlled by means of a signal derived from a data link preload shift register 35. The input to the preload shift register 35 is derived from the electronic control interface unit 25 illustrated in FIG. 1, and temporarily stores command signal which instructs the firing order latch circuit 33 when to couple a cycle initiating discrete pulse signal to the main storage memory unit 37. The clock pulse signals are coupled from the signal conditioning circuit to a comparator in the main storage unit 37 as explained in U.S. Pat. No. 3,969,703, wherein the clock pulses which represent the time elapsed in a machine cycle are compared with component actuating times stored in a shift register or random access memory. The component actuating times stored in the main storage 37 are coupled thereto via the data link preload shift register 35 which in turn derives the actuating time input information from the electronic control interface unit 25. The particular times at which the machine elements are to be actuated may be varied by the operator by appropriately pressing a "sooner" or "later" button in the operator control console 15. Thus, during the operation of the machine, by appropriately pushing either the "sooner" or the "later" button together with a function select control which selects the machine component whose cycle operating time is being changed, the manner of operating the machine can be readily varied. The main storage 37 also drives the function degree display 39 in the operator control 15 which degree display is the stored cycle actuating time number of the selected function.

When a comparison is made in the main storage unit between the clock pulse timing signal and the stored component actuating time signals, an output is provided to the enable gating circuit 41. The enabled gating circuit 41 provides an energizing signal to the decoder and valve drive circuit 43. The decoder circuit selects which component is to be actuated and hence which valve drive is to be energized. When the appropriate valve driver is energized, the associated machine component is actuated by either initiating or terminating its operation.

If the machine is initially shut down and it is desired to start up the machine, an appropriate starting signal is coupled to the program start sequence memory 45 from the start-stop control switches in the control 15. The particular starting sequence program is coupled to the start sequence memory 45 via the data link shift register 35 which in turn receives its input from the electronic control and interface unit 25. Thus, by appropriately keying into the storage unit in the electronic control interface unit 25, a pre-selected starting sequence, the sequence is coupled to the start sequence memory unit 45, which memory unit is actuated when the start button is the control 15 is pressed. As will be explained more fully hereinbelow, the output of the electronic control interface unit can also be utilized to modify the starting sequence by varying the timing of operation of selected components of the individual section machine. The output of the start memory sequence 45 is coupled to the enable gating circuit 41, which in turn couples this signal to the decoder and valve drive circuit 43 for operating in a pre-selected manner the various components of the section being controlled.

If it is desired to shut down the machine, the "stop" button in the operator control 15 is pressed to provide an appropriate signal to the stop sequence memory unit 47. The particular stop sequence utilized depends upon the type of machine being controlled. The appropriate stop sequence commands are written by means of the keyboard in the console 23 into the memory unit in the electronic control interface unit 25. The stop sequence is coupled to the stop sequence memory 47 via the data link shift system 35 from the electronic control interface unit 25. As with the case of the start sequence, the stop sequence can be modified depending upon the desires of the operator in order to vary the timing of operation of the selected components. The timing signals for variation of the stop sequence is coupled to the stop sequence memory unit 47 via the data link shift register 35. The stop sequence control commands are coupled from the stop sequence memory 47 to the enable gating circuit 41 and then to the decoder and valve drive circuit 43 for appropriately controlling the various machine components of the section being controlled.

The signals corresponding to the operational sequences of the main storage memory, the start sequence memory, the stop sequence memory, and the firing order latch circuit are each coupled to a data accumulator shift register 49 which in turn couples this information in serial fashion back to the electronic control interface unit 25 where this data is stored in the storage unit.

Should it be desired that the machine be started or stopped on a manual basis, a manual switch 51 is closed. This enables the machine section firing order to be selected from a thumbwheel switch and overrides the program start and stop memories with hard wired circuitry for a simple start and stop procedure.

Figure 3:
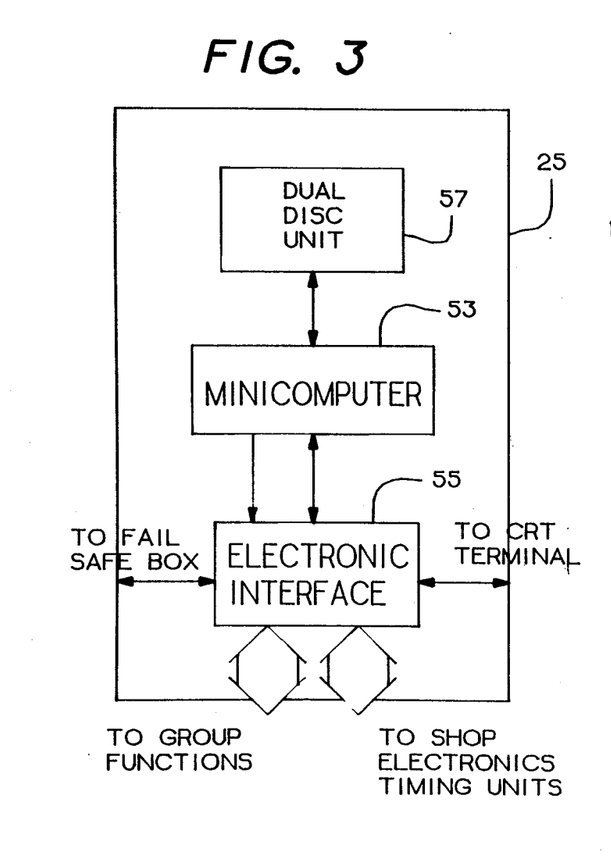
FIG. 3 is a simplified block diagram of the electronic control and interface unit of the present invention.

Refer now to FIG. 3 where there is disclosed a more specific schematic block diagram of the electronic control interface unit 25. This unit includes a minicomputer 53 which may be of any suitable design known in the art, and which in the preferred embodiment is a Nova 1200 manufactured by Data General Corporation. The minicomputer 53 is equipped with a 16-bit digital input/output port through which electronic signals are generated and received by the minicomputer. These signals are linked to a plurality of electronic interface modules 55 by separate inut and output busses. In the preferred embodiment there are 31 such interface modules capable of controlling up to 31 individual section machines from one central electronic control interface unit. When information is to be transmitted from the minicomputer 53 to any section control unit 13 or to any group function unit 29, the address of the particular receiving unit is transmitted on the output bus from the minicomputer 53 along with the data to be transmitted. Hard wired in each interface module 55 is the address of its associated section control unit 13 and, accordingly, when the minicomputer's generated address compares with the wired module address, the data is routed through that module to the appropriate section control unit 13.

Each electronic control interface unit also includes a dual disk storage unit 57 which is utilized as a mass storage medium for all job history information derived from the respective section control units 13. Since such a disk can hold several million storage words, all job history information for an entire plant can be stored in the dual disk unit 57. As a result of this, immediate access to all job history information can be readily obtained by merely instructing the console 23. The operator can load and record job history information from and to the disk memory unit 57 by entering the proper commands at the keyboard of the console. It should be understood that in keeping with the present invention, other suitable memory systems and storage media can be utilized. The specific storing unit and minicomputer described herein are preferred but others can be used in the system of the present invention.

Figure 4:
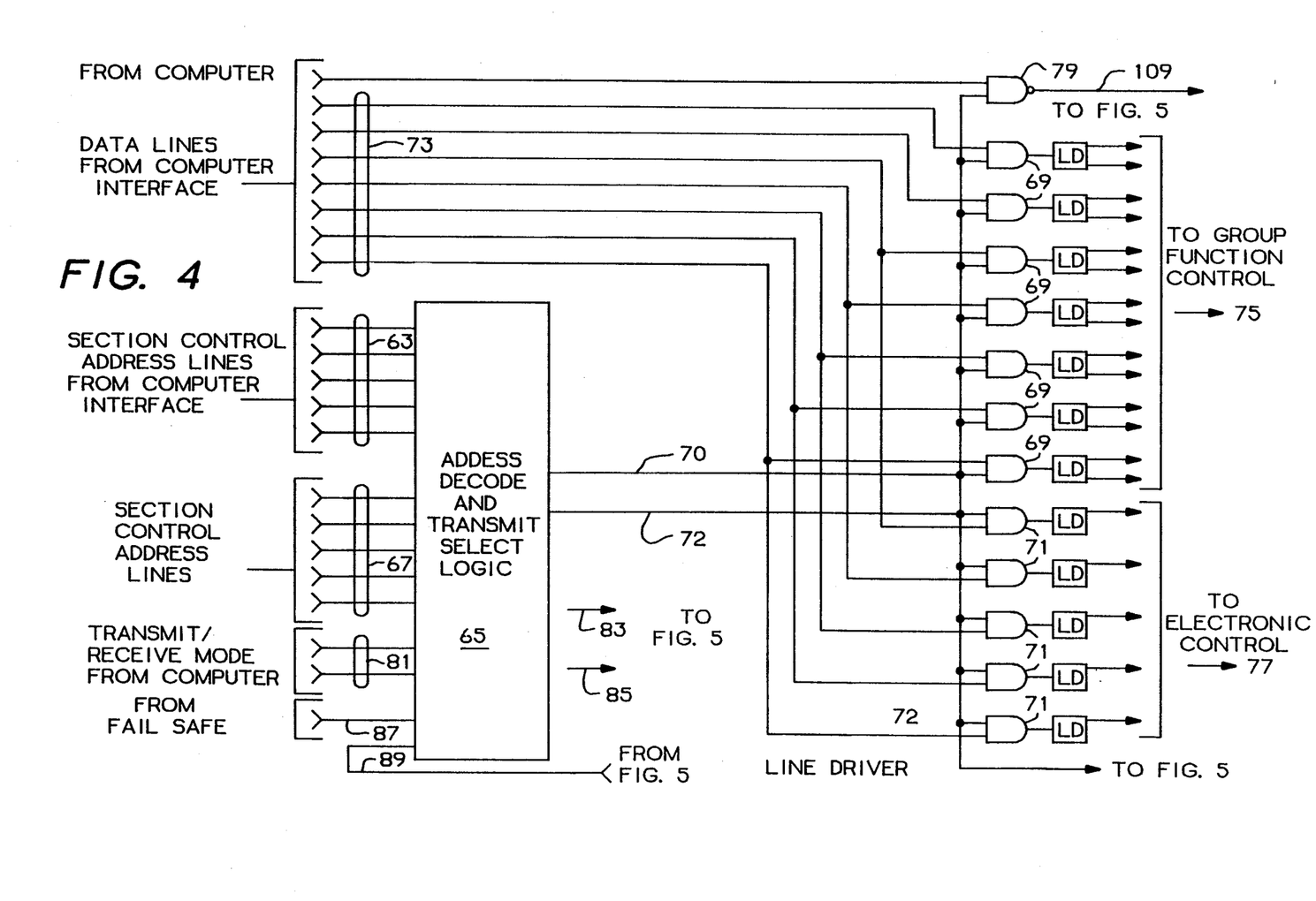
FIG. 4 is a schematic block diagram of the electronic interface module of FIG. 3.

Refer now to FIG. 4 which is a schematic block diagram of the transmit section of one of the interface modules 55. As aforementioned, in the preferred embodiment there may be as many as 31 such interface modules under the control of a single minicomputer 53 and each such interface module is associated with a single section control unit. Also, as previously mentioned, 16 input/output lines connect the minicomputer 53 and each interface module 55. As illustrated, five section control unit address lines 63 from the computer are connected to an address decoder and transmit select logic circuit 65. Also connected to the address decoder and transmit logic 65 are the five hard wired address lines 67 with each of the address lines having a particular code in digital form, i.e., high or low signals, which identifies or addresses a particular section control unit. Thus when the code appearing on the address lines 63 from the minicomputer compares with the hard wired code on lines 67, a compare signal is generated on line 70 which enables group function gates 69 and on line 72 which enables section control unit gates 71. With these gates enabled, data signals from the minicomputer are coupled via lines 73 through each of the enabled gates 69 and 71 to the group function line drivers 75 and the section control unit line drivers 77. The line drivers amplify, isolate and couple the data signals to the respecive group function control units and to the data link pre-load shift registers 35 in the appropriate section control unit. The output of NAND gate 79, as will be seen hereinbelow, is utilized to inform the minicomputer of the current status of communication with the section control unit, the group function units and to set the address decoder and transmit logic 65 to the appropriate transmit or receiver mode.

Input lines 81 are connected to the minicomputer and transmit information thereon for indicating whether data or instructions are being transmitted to (1) the group function controls 29 or to (2) the section control units 13 or whether data or instructions are being coupled from (3) the group function controls 29 or (4) the section control units 13 to the minicomputer. In response to signals on input lines 81, an appropriate signal is provided on output line 83 or 85. Lines 83 and 85 are connected to the receive section to the circuitry illustrated in FIG. 5 for enabling or inhibiting a set of gates which control the passage of information from the group function controls or the section control units to the minicomputer. Input line 87 is derived from the fail safe unit and if the signal in this line is true or high, information can be transmitted to the group control or to the section control unit. Should the signal on the fail safe line be low, then a high or true signal must appear on line 89 in order for information to be transmitted to the respective section control unit or the group function control. As will be seen below the signal on line 89 is derived from the status control circuitry illustrated in FIG. 5. It should be appreciated by those skilled in the art that the address decoder and transmit logic 65 is merely a set of gates which serve to decode the input information thereto and to provide at the output gate enabling signals for enabling or inhibiting the transfer of information to or from the respective section control unit 13 and group function control 29 associated with each IS machine.

Figure 5:
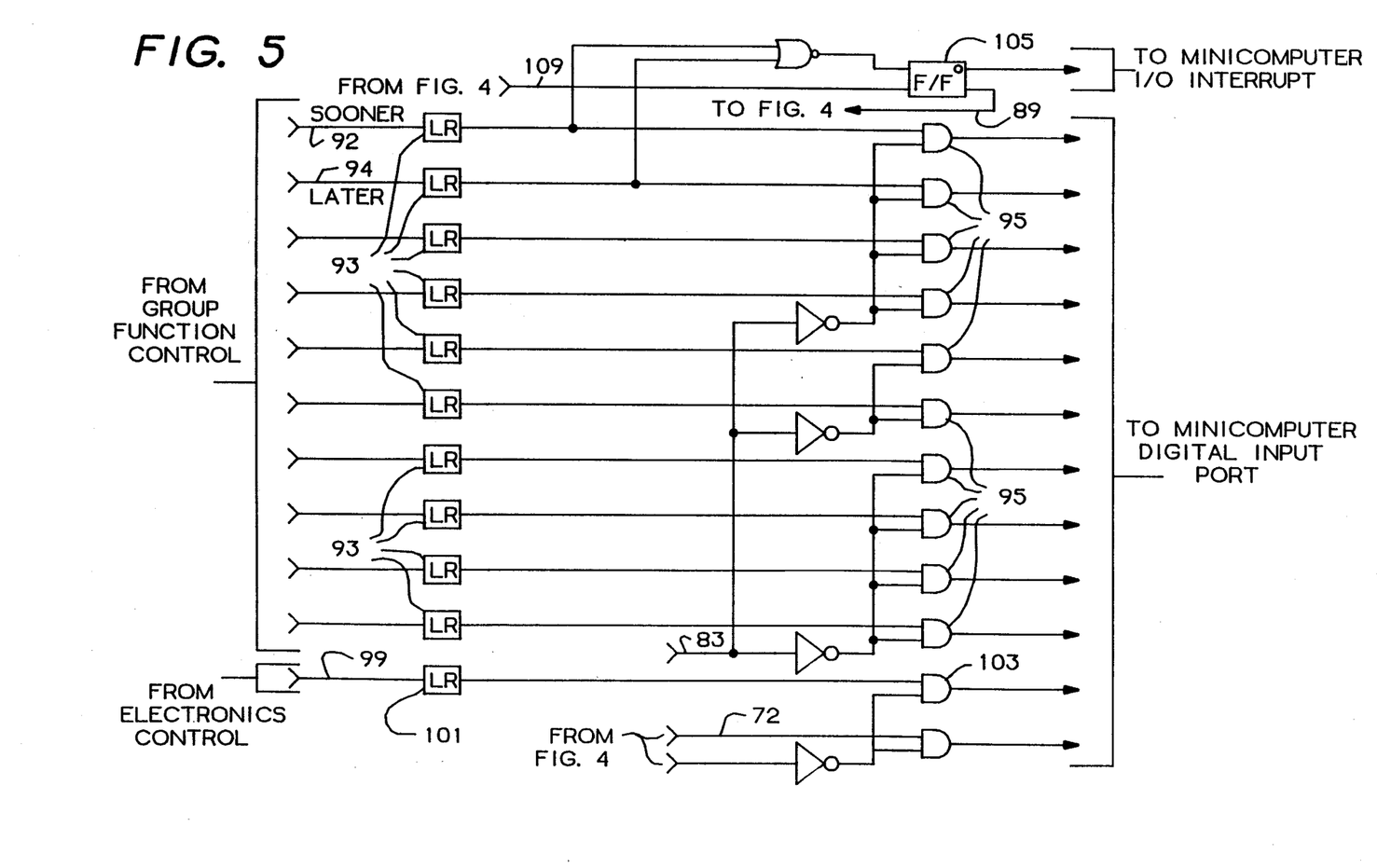
FIG. 5 is a schematic block diagram of the electronic interface module.

FIG. 5 is a schematic block diagram of the receiver circuitry of an interface module 55. It will be appreciated that there is one such receiver circuit for each of the 31 possible interface modules in the electronic control interface circuit 25. As illustrated, a plurality of lines are derived from each group function control 29 and are connected through line receiver amplifiers 93 to a series of AND gates 95. The AND gates 95 are each enabled by a signal on line 83, which is derived from output line 83 of the address decoder and transmit logic circuitry 65 of FIG. 4. Thus, when the output on line 83 of the address decoder and transmit logic 65 is high, each of the gates 95 are inhibited so that information cannot pass from the group function control 29 to the minicomputer. On the other hand, when the output on line 83 goes low, the signal line 83 goes low and accordingly each of the AND gates 95 are enabled to thereby permit the passage of information from the group function control 29 to the minicomputer. Line 99 is derived from the output of the data accumulator shift register 49 of the section control unit and data in serial form is coupled from line 99 via a line receiver amplifier 101 and AND gate 103 to the digital input port of the minicomputer. AND gate 103 is enabled to pass such data when the output signal on line 85 of the address decoder and transmit logic is low. Thus it can be seen that the outputs 83 and 85 of the address decoder transmit logic circuit 65 of FIG. 4 control the reading of information into and out of the minicomputer 53.

A signal on line 72, which is derived from the section control unit enable line 72 in FIG. 4, is coupled to the computer when information is being transmitted from the data accumulator shift register in the section control unit to the minicomputer. This signal informs the computer that information is actually being coupled from the section control unit to the computer.

A flip-flop 105 is illustrated, which when set, couples a signal to the digital input/output interrupt of the minicomputer 53 to command the computer to interrogate each of the group function controls 29 to determine which function control requires service thereto. The flip-flop 105 is set by a signal which appears on either line 92 or 94, which signals indicate that data is to be transferred from the group function control to the associated minicomputer. After the information from the group function unit has been received by the computer, a signal from the computer is coupled to NAND gate 79, the output of which is coupled on line 109 to the reset input of the flip-flop 105. Thus the flip-flop 105 is reset and the signal on line 89, which is coupled to the input of the address decoder and transmit logic circuit 65 goes high. This enables the transmittal of information from the minicomputer to the associated group function control 29 or section control unit 13. The Q output of the flip-flop 105 is coupled to an "OR" gate, not shown, together with that of each of the other 31 modules. The output of the "OR" gate is then fed to the computer external interrupt and thus whenever the flip-flop is set an interrupt is generated to the computer, requiring the computer to interrogate each of the interface modules to determine which group function unit requires service.

Figure 7:
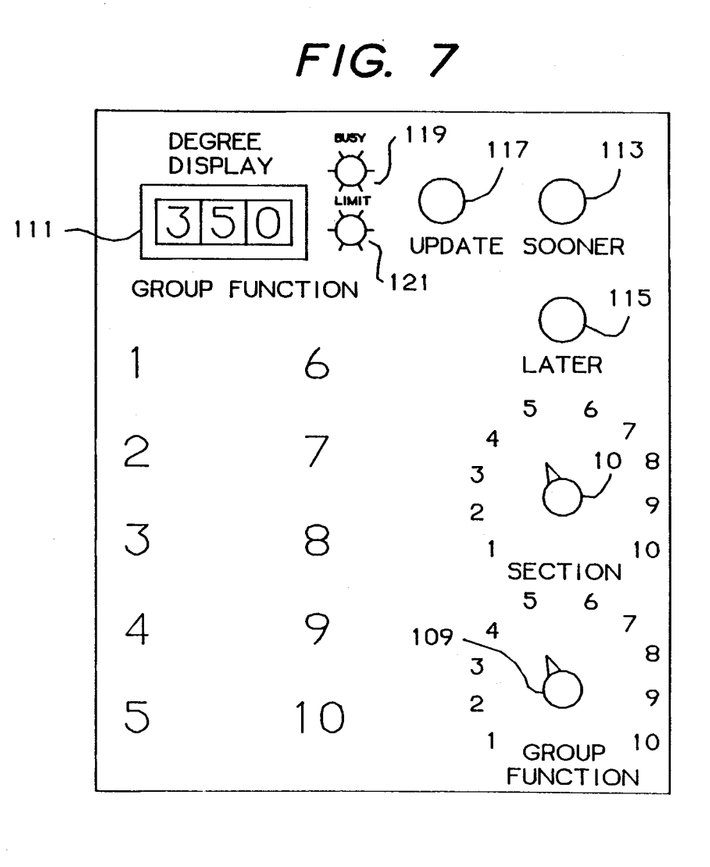
FIG. 7 is a plan view of the operator controls for the group function system.

Refer now to FIG. 7 which is a side elevation view of the front panel of a group function control 29 of the present invention. Illustrated in the front panel is a section switch 107 which selects which section of the glassware forming machine is to have the timing of a group of functions varied. The front panel also has a group function switch 109 which defines the particular group of movable components which are to have their timing varied. The group function set up will vary with the particular needs of each system of glassware forming machines. Two component operations for each group function are preferably indicated on the front panel of the group function control 29 next to the group function numbers 1–10. It should be understood, of course, that the groups of movable components can be arranged into less than ten groups if desired depending, as aforementioned, upon the particular requirements of each system. Three digit, seven segment display 111 is mounted on the front panel of the group function control and serves to provide the operator with an indication of the degree or cycle time when the first movable component of a group selected by the group function switch 109 is actuated. Thus the degree display 111 provides an indication to the operator of the current status of the timing of each of the group functions.

Also positioned on the front panel are three pushbutton switches, i.e., the "sooner" switch 113, the "later" switch 115 and an "update" switch 117. The depression of the "sooner" button 113 advances the time settings of all functions in the group selected by group function switch 109 in single degree increments for the duration when the button is depressed. As each degree of change is being effected, the degree display 111 indicates such by displaying the change of degree setting of the first movable component for function of a group. It should be understood, of course, that while in the preferred embodiment the first movable component has its time displayed in the degree display 111, timing of other key movable components could be displayed in lieu of the first movable component in the group function. This, of course, depends upon the particular requirements of each system. When the "later" button 115 is depressed, the time settings of all functions in a group selected by the group function switch 109 is retarded. Retardation proceeds in single degree increments during the time that the "later" button 115 is depressed. As each degree change is effected, the degree display 111 indicates the change so that the operator can determine how long to keep the button depressed.

Once the section switch 107 or the group function switch 109 is changed, the "update" button 117 must be depressed in order to display in the degree display 111 the degree or time of actuation of the first or key function of the group in the section selected. Finally, the panel of the group function control 29 has a busy indicator 119 and a limit indicator 121 which in the preferred embodiment are light emitting diode indicators. The busy indicator 119 is energized whenever the minicomputer 53 is presently servicing another group function control or electronic control unit 13. This simply indicates to the operator that his group function control is temporarily disabled. The limit indicator 121 is energized whenever a group function change has reached a preset limit. Thus, for example, if the timing of the group of functions in group function 1 is advanced so that the timing of the last movable component approaches the time of actuation of the first movable component of the second group function, the limit switch 121 would be energized. This serves to protect the operator from making large group function changes which might possibly result in damage to the system.

Figure 6A:
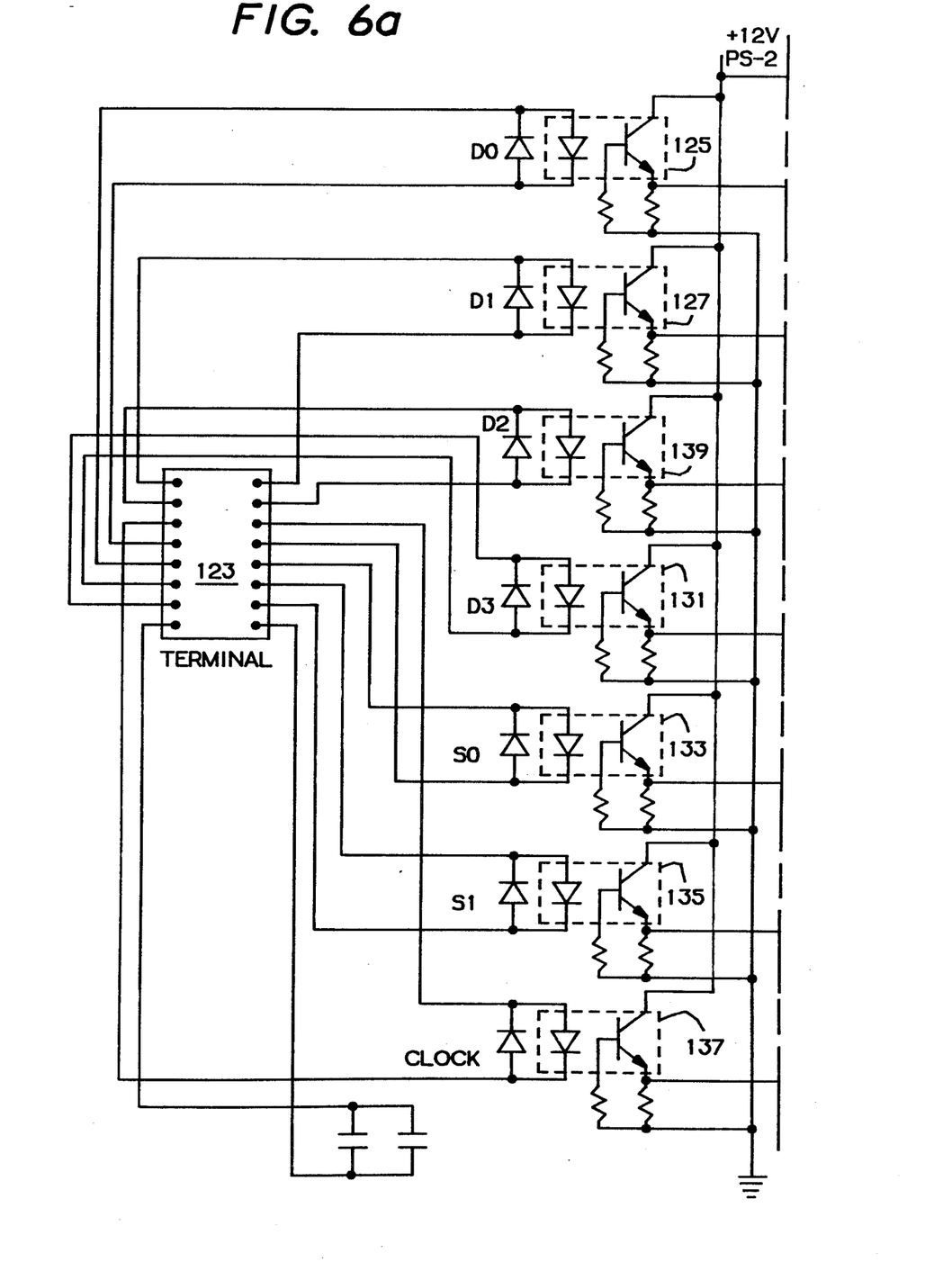
FIGS. 6a, 6b and 6c are a more detailed schematic block diagram of the group function control circuitry of FIG. 1.
Figure 6B:
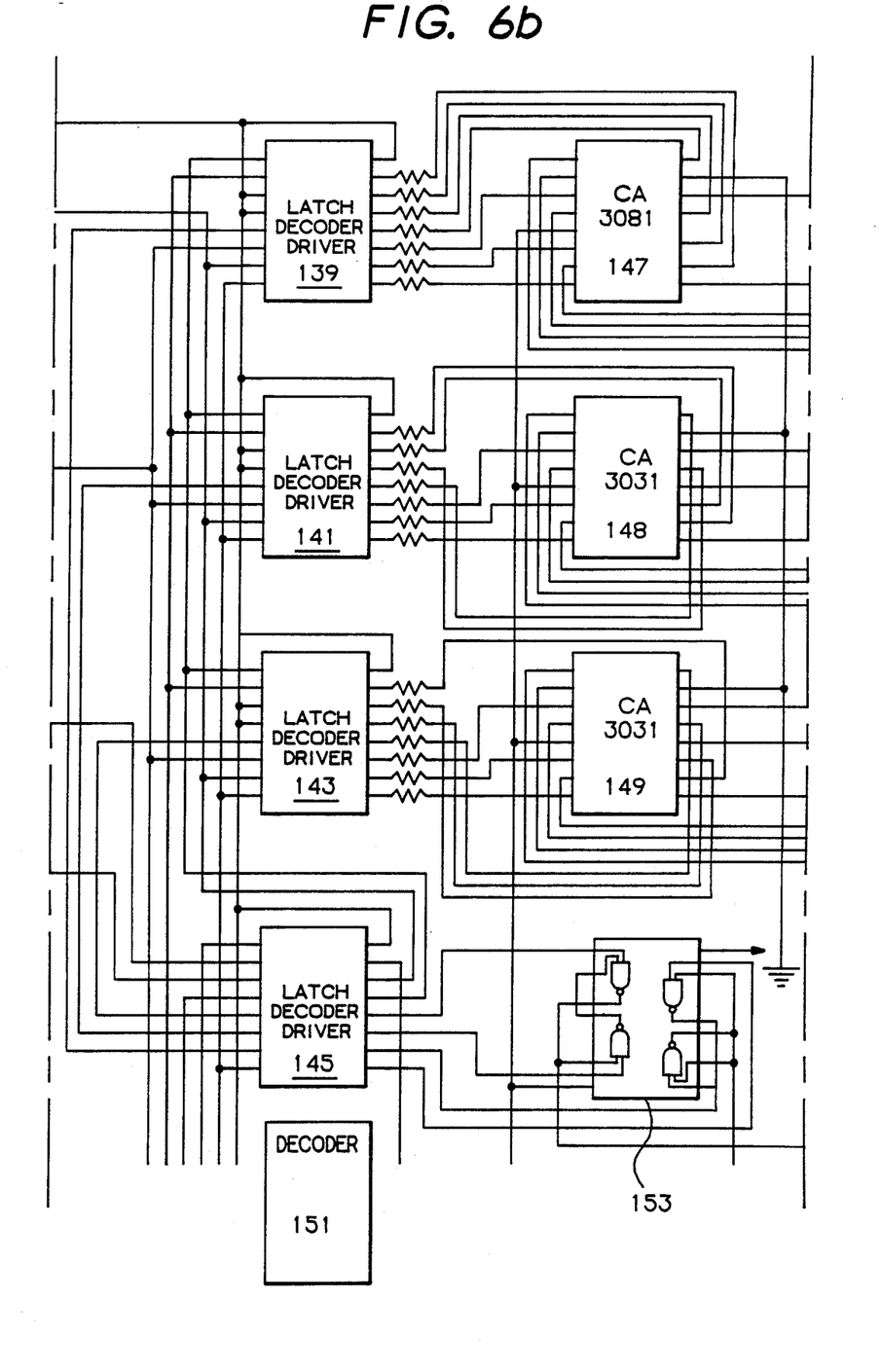
Figure 6C:
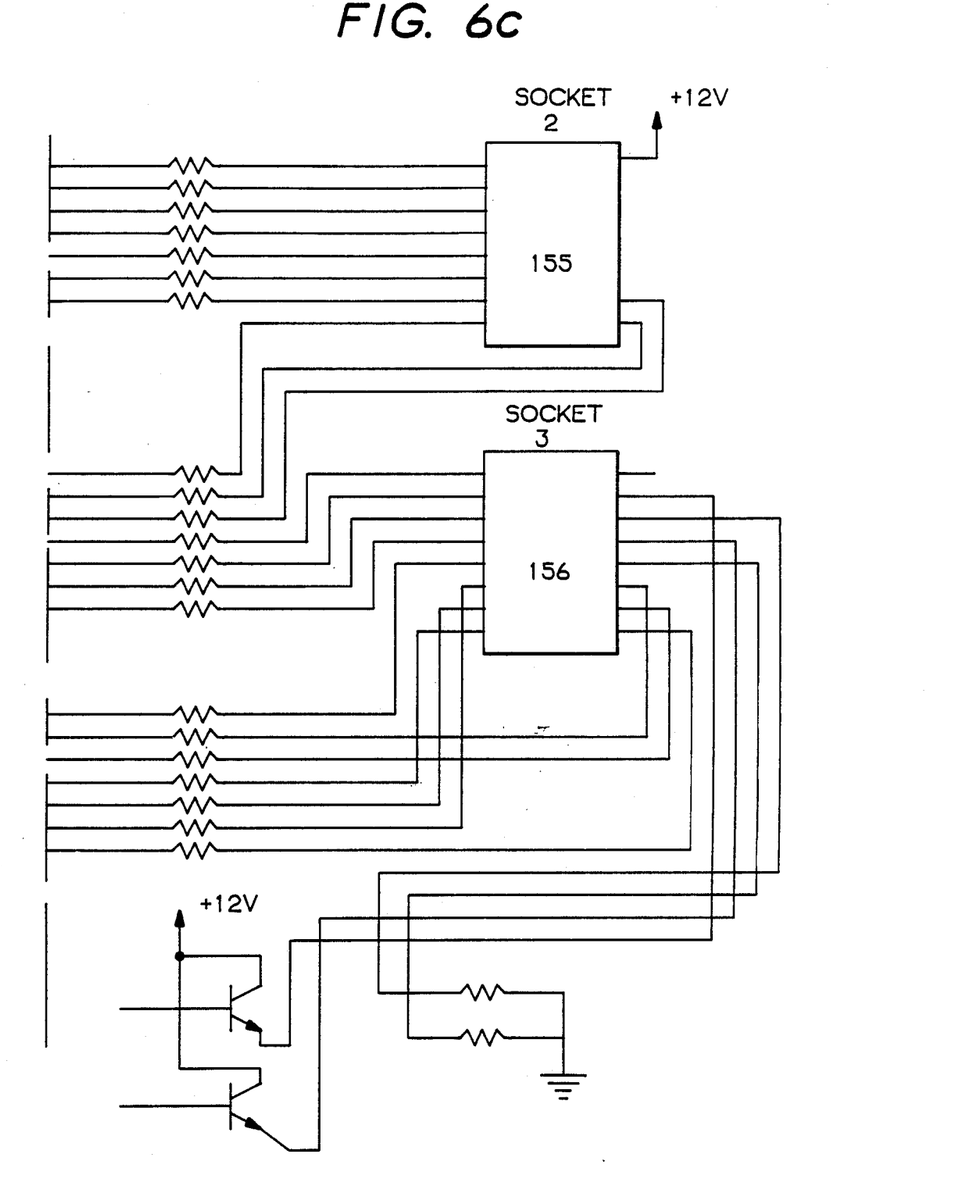

Refer now to FIGS. 6a, 6b and 6c which are, taken together, a schematic circuit diagram of the circuitry in the group function control for energizing the busy and limit switches 119 and 121, respectively, and the degree display 111. Illustrated in FIG. 6a is a socket terminal 123 which serves as a means of connecting the group function control 29 to the interface circuit 55 illustrated in FIG. 4 by means of a multiconductor cable of twisted shielded pairs. To the terminal 123 are connected a plurality of opto-isolator circuits 125–137. The lines from the terminal 123 to the opto-isolaters 125, 127, 129 and 131 provide information in format for the three digit display 111 illustrated in FIG. 7. The opto-isolators 133 and 135 connected to the terminal 123 define which of the three digits of the display, the information output of the opto-isolators 125–131 is to be coupled too. Thus as information from the computer 53 is coupled via lines 73 and gates 69 as illustrated in FIG. 4 to the optoisolators 125–131 in sequence, the control data coupled via lines 73 and gate 69 to the opto-isolators 133 and 135 defines which of the three digits of the three digit display are currently being energized. Finally, the opto-isolator 137 receives via terminal 23 clock pulses from the minicomputer 53 in order to clock into the three digit display the information coupled to optoisolators 125–131.

The opto-isolators are each powered by a separate power supply positioned in the group function control so that the group function control is effectively isolated from the computer 53 or the computer interface 55. The output of the opto-isolator circuits 125–137 are coupled to a series of latch decoder driver circuits 139–143.

Each of the latch decoder driver circuits are preferably MC14511 drivers manufactured by Motorola. Since these circuits are commonly available and known, a detailed description thereof will not be presented herein. The latch decoder drivers decode the BCD coded output information of the opto-isolators 125-137 for driving the three digit, seven segment display 111 illustrated in FIG. 7. The outputs of the latch decoder drivers 139, 141 and 143 are coupled to amplifier circuits 147, 148 and 149 which amplifiers drive the three digit, seven segment display 111.

The outputs of opto-isolators 133, 135 and 137 are coupled to the dual 104 decoder 145 and to the CD4023AE decoders 151 and 153. Each of these decoders are commercially available and are manufactured and sold by the RCA Corporation. The function of these decoders is to decode the digit display information coupled to the opto-isolators 133 and 135 for appropriately providing energization signals to the degree display 111 via the terminal units 155 and 156 and to the busy and limit display LED's 119 and 12, respectively. The terminals 155 and 156 illustrated in FIG. 6c serve to connect the degree display 111 with the circuitry of FIGS. 6a-c.

The information coupled to the opto-isolators 133 and 135 also includes information as to whether the computer is already engaged with servicing another group function control and/or whether a certain group function time variation has reached its limit.

While the present invention has been described herein in connection with the preferred embodiment thereof, it should be understood that there could be other embodiments of the invention which fall within the spirit and scope of the invention as defined by the appended claims.

What is claimed is:

1. A glassware-forming system, comprising:
   at least one glassware-forming machine having a plurality of sections, each section of each machine having a plurality of movable components which are actuatable to operate in a synchronized relationship to form rigid glassware;
   a gob feeder for feeding molten glass to each section of the glassware-forming machine;
   section control means including a plurality of controllers capable of varying the actuating times of movable section components and including stored and variable programs for the operation of identified movable section components;
   a system control adapted to permit an operator to vary system operations and including a central processing unit for transferring variable time data from the system control to the plurality of controllers, said system control including a group function control means for automatically controlling the variation of operating times of at least one group of movable section components by the plurality of controllers when the change in operating time of one movable section component in the group necessitates corresponding changes in the operating times of other movable section components in the group, said group function control means including a data bank with the central processing unit; and
   a rapidly accessible data storage means capable of storing job history information on the timing and synchronization of the movable components of the sections of the glassware-forming machine.

2. The system of claim 1 wherein the system further includes a plurality of machines, a fail-safe unit, and an electronic interface means including a plurality of modules associated with each controller of each section control means, said modules providing means to address decode, and transmit information from the central processing unit to data-identified controllers of each section control means, and means to block transmission of information between the system control and non-identified controllers upon actuation of the fail-safe unit for preventing an operator from varying component operating times of the wrong section control means.

3. A glassware-forming system, comprising:
   at least one glassware-forming machine having a plurality of sections, each section having a plurality of movable components which are actuatable to operate in a synchronized relationship to form rigid glassware.
   a gob feeder for feeding molten glass to each section of the glassware-forming machine;
   section control means including a plurality of controllers capable of varying the actuating times of the section components and including stored and variable programs for the operation of identified movable section components; and
   a system control, comprising:
   a central control adapted to permit an operator to vary system operations;
   a central processing unit for transferring variable time data between the system control and the section control means;
   a rapidly accessible data storage means capable of storing job history information on the timing and synchronization of the movable components of the sections;
   a fail-safe unit; and
   electronic interface means for isolating the system control from the section control means and for presenting data from the system control to only data-identified controllers;
   the electronic interface means including a plurality of modules associated with each controller of the section control means, said modules providing means to address decode, and transmit information from the central processing unit to data-identified controllers of the section control means, and means to block transmission of information between the system control and non-identified controllers upon actuation of the fail-safe unit for preventing an operator from varying component-operating times of the wrong section control means.

4. The system of claim 3 wherein the system control includes a group function control means for automatically controlling the variances of operating times of section components in groups when the change in operating time of one section component in a group necessitates corresponding changes in the operating times of other section components in the group, said group function control means being connected with the electronic interface means by a plurality of links.

5. In a glassware-forming system including at least one glassware-forming machine having a plurality of sections and section control means, each section including a plurality of movable components which are operated in timed relationship with respect to one another by said section control means in each of a plurality of cycles to form rigid glassware, a gob feeder for feeding gobs of molten glass from a predetermined location to each section of said at least one machine, a method of controlling said system, comprising the steps of:

generating a signal indicative of the time elapsed in each cycle of operation of said machine;

storing in said section control means, the relative times in a machine cycle when said plurality of components in the associated section is to be operated;

controlling in response to the generation of said elapsed time signal and component operating time signals stored in said section control means, the operating times of said movable components of said sections;

varying system operation by selectively entering into said system by means of an operator keyboard means, a series of varied component operating times to change when one or more of said movable components are to be operated in a machine cycle;

communicating said varied component operating times between said keyboard and said section control means to record and to change the timing of said movable components; and inhibiting said operator keyboard means from communicating with said section control means if said operator attempts to vary component operating times of the wrong section control means.

6. In a glassware-forming system including at least one glassware-forming machine having a plurality of sections and section control means, each section including a plurality of movable components which are operated in timed relationship with respect to one another by said section control means in each of a plurality of machine cycles to form rigid glassware, a gob feeder for feeding gobs of molten glass from a predetermined location to each section of said machine, a method of controlling said glassware-forming system comprising the steps of:

generating a signal indicative of time elapsed in each cycle of operation of said machine;

storing in said section control means the relative times in a machine cycle when said plurality of components in each section is to be operated;

controlling in response to the generation of said elapsed time signal and the component operating times stored in said section control means, the operating time of said movable components of said sections;

automatically varying the operating times of a related group of components of the glassware-forming machine when the change in operating time of one component in said group necessitates corresponding changes in the operating times of the other components of said group;

communicating said varied component operating times through a central processing unit to said section control means of the machine to thereby record the varied timing of said movable varied components in said section control means and to change the timing of said movable components.

7. The method of claim 6 further comprising the steps of:

selectively entering into said second control storage means by keyboard means a series of varied times in a machine cycle when one or more of said movable components are to be operated; and automatically inhibiting said selective entry when an attempt is made to enter data into the wrong machine sections.

8. The method of claim 7 further comprising the step of:

visually displaying to the person operating said keyboard a sequence of steps for operating said keyboard as said keyboard is being operated; and communicating said varied component operating times through a central processing unit to said mass storage means and said section control storage means to change the timing of said movable components.

* * * * *